United States Patent [19]

Baghdasarian

[11] Patent Number: 5,785,280
[45] Date of Patent: Jul. 28, 1998

[54] HYBRID SOLAR PANEL ARRAY

[75] Inventor: Varouj G. Baghdasarian, Cupertino, Calif.

[73] Assignee: Space Systems/Loral, Inc., Palo Alto, Calif.

[21] Appl. No.: 504,484

[22] Filed: Jul. 20, 1995

[51] Int. Cl.$^6$ ................................ B64G 1/44
[52] U.S. Cl. ............... 244/173; 74/89.22; 16/82; 136/292; 136/265
[58] Field of Search .................. 244/173, 161, 244/159; 74/89.22; 16/49; 136/292, 245

[56] References Cited

U.S. PATENT DOCUMENTS

| | | | |
|---|---|---|---|
| 3,863,870 | 2/1975 | Andrews et al. | 244/173 |
| 4,014,617 | 3/1977 | Meston | 244/173 |
| 4,043,834 | 8/1977 | Rüsch. | |
| 4,293,731 | 10/1981 | Schweig et al. | 244/173 |
| 4,371,134 | 2/1983 | Marello et al. | 244/173 |
| 4,394,529 | 7/1983 | Gounder | 244/173 |
| 4,988,060 | 1/1991 | Janson et al. | 244/173 |
| 5,037,043 | 8/1991 | Roth et al. | 244/173 |
| 5,509,747 | 4/1996 | Kiendl | 244/173 |
| 5,520,747 | 5/1996 | Marks | 244/173 |

FOREIGN PATENT DOCUMENTS

| | | |
|---|---|---|
| 0 064 917 | 11/1982 | European Pat. Off. . |
| 2 051 480 | 1/1981 | United Kingdom . |

OTHER PUBLICATIONS

Proceedings of the First European Symposium on Photovoltaic Generators in Space, 11–13 Sep. 1978, Champion et al., "The ESA Lightweight Hybrid Solar Array", pp. 247–253.

Thirteenth IEEE Photovoltaic Specialists Conference, 5–8 Jun. 1978, Williams et al., "The ESA Lightweight Hybrid Solar Array" pp. 226–231.

Aircraft Engineering, Jan. 1984, Kellermeier et al. "The Retractable Ultra-Lightweight (ULP) Solar Array For Retrievable Space Platforms" pp. 2–5.

Proceedings of the European Space Power Conference, Aug. 1989, Cruijssen, "Solar Array Designs For Columbus Elements" pp. 573–584.

Twenty First IEEE Photovoltaic Specialists Conference, 21–25 May 1990, Ralph et al., "Retractable Planar Space Photovoltaic Array", pp. 1369–1363.

Primary Examiner—Andres Kashnikow
Assistant Examiner—Tien Dinh
Attorney, Agent, or Firm—Perman & Green, LLP

[57] ABSTRACT

A hybrid solar panel array is mounted on a satellite sidewall for movement between a stowed position proximate the satellite sidewall and a deployed position extending away from the satellite sidewall. The array comprises a yoke pivotally mounted on the satellite sidewall and first and second rigid solar panels, the first panel being pivotally mounted to the yoke, the first and second panels being hinged together. In one embodiment, a plurality of semi-rigid solar panels are pivotally mounted to the first and second rigid solar panels. In another embodiment, a flexible solar panel is attached to the rigid solar panels. Drive mechanisms are operable for moving the array from a stowed position proximate a satellite sidewall to a deployed position extending away from the satellite sidewall. The rigid panels are so moved in a synchronous operation and the semi-rigid and flexible solar panels are so moved in a sequential operation.

16 Claims, 6 Drawing Sheets

HYBRID SOLAR PANEL ARRAY

BACKGROUND OF THE INVENTION

1. Field of the Invention

The present invention relates generally to communication satellites, space stations, and the like which utilize solar panel arrays as a major source of power. More specifically, the invention relates to a hybrid solar panel array which employs combinations of rigid solar panels with semi-rigid solar panels in one instance and with flexible solar panels in another instance.

2. Description of the Prior Art

The primary power source for communication satellites and space stationed crafts are provided by solar arrays using some type of photovoltaic solar cells. The arrays are normally stowed against the satellite during launch, and deployed either after separation from the launch vehicle or once they are in their final orbital location.

A solar array is designed to meet specific structural and electrical requirements of a particular satellite. Besides the power requirements of an array which dictates the size of the array, one of the structural requirements of an array is its minimum deployed frequency, and strength to sustain the launch and transfer orbit loads. The deployed frequency and the strength are functions of structural material, size, and the mass. In general, the heavier the array, the lower the frequency, and larger the disturbance loads during spacecraft maneuvers. Powerful satellites require large arrays, and large arrays are massive, less stiff, and require more volume to package for launch.

There have been continual improvements in the efficiency of the solar cells and the structural materials used to manufacture solar arrays, thereby making larger and more efficient solar arrays possible. However, each array is designed for a specific application and to specific requirements. There are a number of different types of cells and different types of structures used for the solar array, each one different in shape, size, deployment concept and performance characteristics. Generally, the structure for the smaller arrays (used in most communication satellites) are made of a yoke and few rigid panels hinged together like shown in FIG. 1, whereas the structure for larger arrays (used in space programs, like space station) are made of a large flexible blanket stretched out between two rigid beams by an extendible rigid boom like shown in FIG. 2. Each type has its advantages and limitations. Rigid arrays are stiffer, lighter and more cost effective for lower power requirements (less than 5 to 8 KW), whereas flexible blanket arrays are less rigid, massive and cost effective for high power needs (higher than 20KW).

Further, rigid panels must be designed to sustain the launch loads, and usually require more room to stow than flex arrays. Some satellites require partial power from the array during transfer orbit phase which requires the array to be either fully deployed or partially deployed. Rigid arrays may be partially deployed in transfer orbit, whereas blanket arrays are usually designed to be fully deployed in their operational orbit.

Since neither rigid arrays nor flexible arrays can easily substitute each other and provide cost effective power for the intermediate range (10 to 20 KW, where future communication satellite needs are), there is a need for an array that can be partially deployed in transfer orbit, be lightweight and stiff, and yet provide cost effective power for the 10 to 20 KW range.

SUMMARY OF THE INVENTION

It was in light of the state of the technology as just discussed that the present invention was conceived and has now been reduced to practice. According to the invention, a hybrid solar panel array is mounted on a satellite sidewall for movement between a stowed position proximate the satellite sidewall and a deployed position extending away from the satellite sidewall. The array comprises a yoke pivotally mounted on the satellite sidewall and first and second rigid solar panels, the first panel being pivotally mounted to the yoke, the first and second panels being hinged together. In one embodiment, a plurality of semi-rigid solar panels are pivotally mounted to the first and second rigid solar panels. In another embodiment, a flexible solar panel is attached to the rigid solar panels. Drive mechanisms are operable for moving the array from a stowed position proximate a satellite sidewall to a deployed position extending away from the satellite sidewall. The rigid panels are so moved in a synchronous operation and the semi-rigid and flexible solar panels are so moved in a sequential operation.

To meet the requirements for partial deployment and stiffness, the array structure in partial deployed position must be rigid. To meet the operational power demand, the size of the array must be large. Although the array must be stiff for on-orbit station-keeping, it does not have to be very strong to sustain station-keeping disturbance loads. Therefore, it is proposed that an array be designed with minimum size rigid structures to meet the stiffness and strength requirement for partial deployed configuration and maximum size flexible or less rigid structure for the final orbit and operational use.

The proposed array comprises a yoke, two primary, that is, rigid panels, and either a number of secondary semi-rigid lightweight panels or flexible blankets stretched between lightweight rigid members. Since semi-rigid panels, or flexible blankets, are not designed to sustain the launch loads, they must be protected during launch and transfer orbit phase loads. According to the invention, this protection is provided by the two primary panels until full deployment in final orbit, where the strength requirement is much less.

Figure 3:
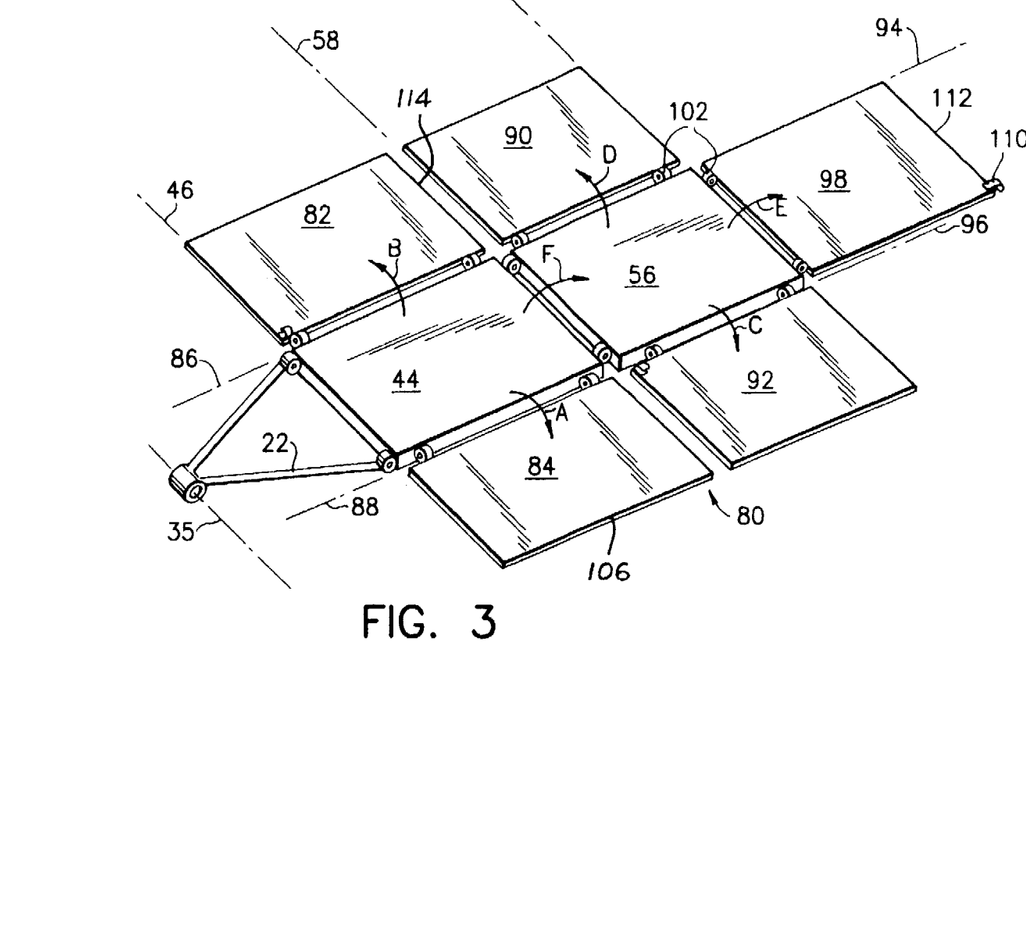
FIG. 3 is a perspective view of a fully deployed hybrid solar panel array embodying the present invention.
Figure 4:
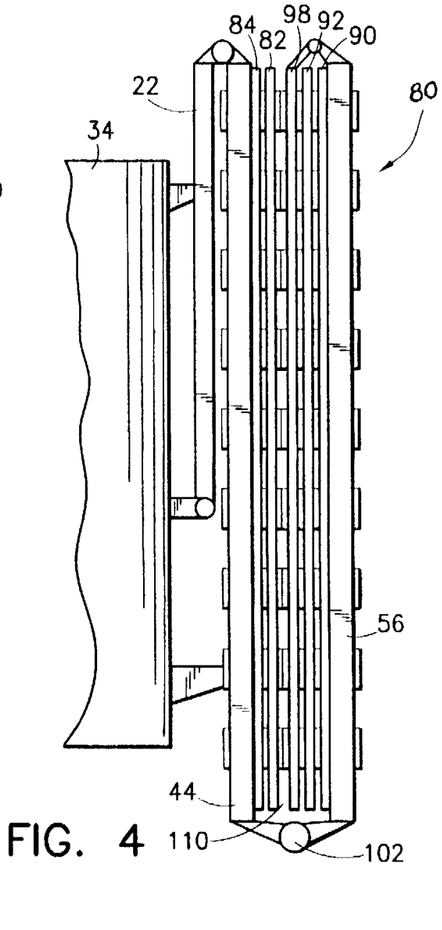
FIG. 4 is a side elevation view of a stowed hybrid solar panel array embodying the present invention.

One considered construction of the proposed array is a seven panel option shown in deployed and stowed configuration in FIGS. 3 and 4 respectively. The deployment yoke and the two primary panels are mutually hinged such that they could be partially deployed as a temporary measure with the secondary panels stowed and clamped between the two primary panels. Thereupon, once the satellite is in its final orbital location, the secondary panels would be allowed to deploy in sequence to their fully deployed configuration.

A number of different holddown and release devices may be used to stow the array against the satellite sidewall, and to clamp the secondary panels within the primary panels (although these expedients are conventional and not within the context of the proposed subject matter).

The secondary panel deployment for the flexible blanket option may be different depending on the configuration and type of cells used.

Some of the advantages and features of the proposed array design of the invention may be related as follows:

(a) existing rigid panel arrays may be easily replaced with the invention thereby providing much higher power to the satellite due to its larger available cell area;

(b) adequate power is provided during a transfer orbit phase;

(c) secondary panels need not be as stiff and strong as the main panels, helping to reduce mass and cost;

(d) a partially deployed configuration can more easily sustain the transfer orbit loads due to its closer center of gravity (C.G.) to the satellite;

(e) a fully deployed array can more easily meet the minimum deployed frequency requirement, again due to its closer center of gravity (C.G.) to the satellite;

(f) although secondary panels require sequential deployment, they do not require the complex and sensitive Closed Cable Loops for deployment coordination, making the design and integration simpler;

(g) no deployment restraint device is required;

(h) heritage hardware that is, existing hardware with flight experience and qualification, may be utilized for many components (including hinges, panel attachments, holddowns, and the like;

(i) the system of the invention can be made lightweight and less costly, due to elimination of conventional lengthy closed cable loop systems and their accompanying deployment restraint devices; and (j) the system of the invention fits within the existing launch vehicle envelope.

Also disclosed is a novel proposed restraint device which is:

(a) simple, reliable and very inexpensive;

(b) requires almost no additional hardware, nor extensive qualification testing to implement on the existing arrays;

(c) can easily replace the more complex and costly deployment restraint devices currently used on most rigid panel solar arrays; and (c) can substantially reduce the cost of an array.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention and, together with the description, serve to explain the principles of the invention in general terms. Like numbers refer to like parts throughout the disclosure.

DETAILED DESCRIPTION OF THE PREFERRED EMBODIMENT

Turn now to the drawings. It was previously noted, with reference to FIG. 1 that, generally, the structure for the smaller arrays used in most communication satellites 20 are comprised of a yoke and few rigid solar panels 24 hinged together whereas, with reference to FIG. 2, the structure for larger arrays 26 used for space stations, for example, are made of a plurality of large flexible blanket solar panels 28 stretched out between two rigid beams 32 by extendible rigid booms 30. Each type has its advantages and limitations. Rigid arrays are stiffer, generally lighter and more cost effective for lower power requirements (less than about 5 to 8 KW), whereas flexible blanket arrays are generally less rigid, massive and cost effective for high power needs (higher than about 20KW).

Figures 1, 1A, 2, 2A:
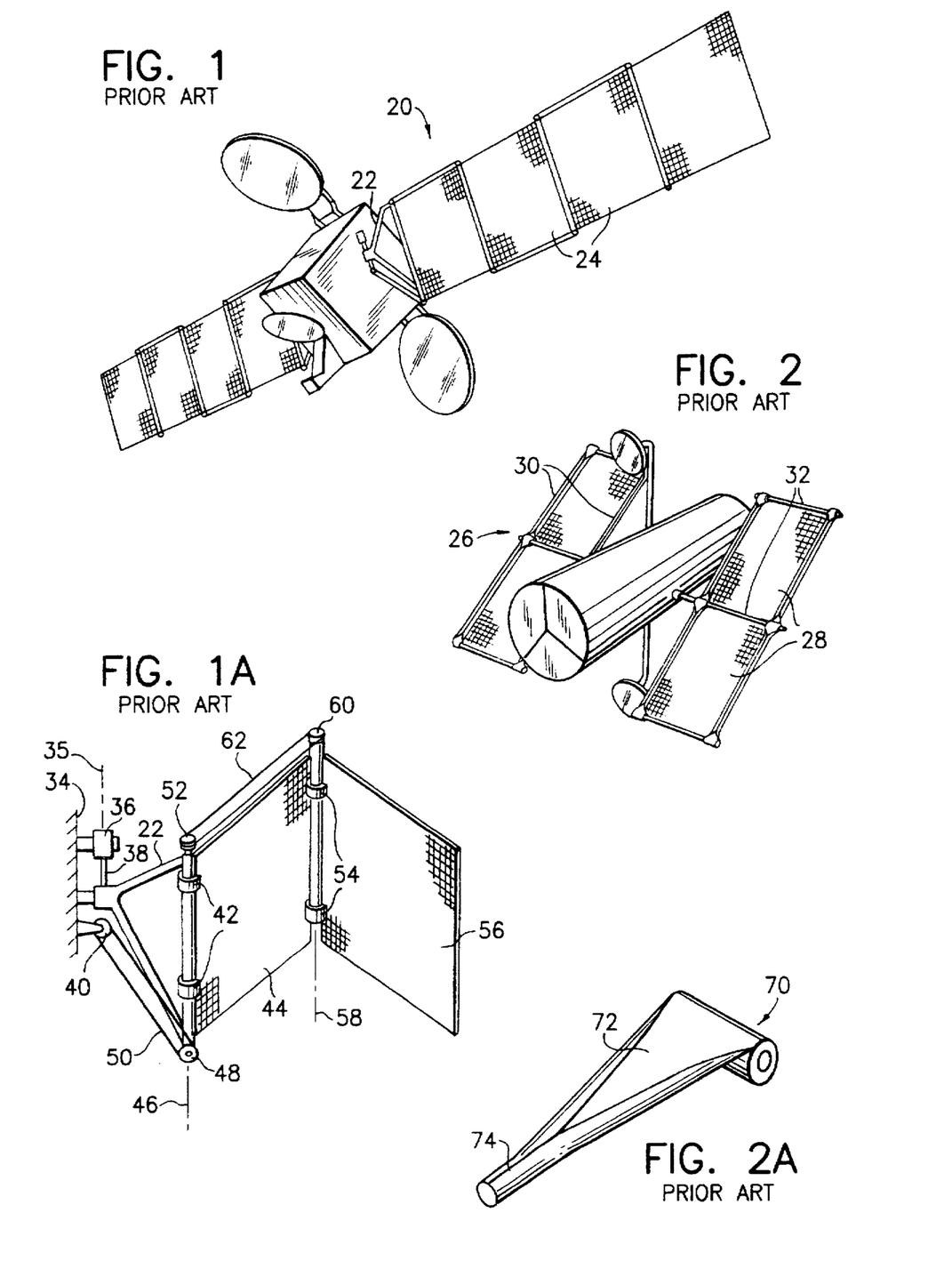
FIG. 1 is a perspective view of a prior art satellite using rigid solar panels.
FIG. 1A is a more detailed perspective view of a part of the prior art satellite illustrated in FIG. 1.
FIG. 2 is a perspective view of a prior art satellite using flexible solar panels.
FIG. 2A is a perspective view of a part of the prior art satellite illustrated in FIG. 2.

With regard to the conventional construction of FIG. 1 utilizing rigid solar panels 24, as seen in FIG. 1A, the yoke 22 is pivotally mounted on a satellite sidewall 34 for rotation about a yoke hingeline 35, such rotation being imparted by unwinding of wound springs located integral with each hinge. The deployment (speed and time) is controlled by selective operation of a deployment restraint motor 36. The motor 36 is selectively operated to rotate a deployment restraint shaft 38, one end of which is fixed to the yoke. A synchronization pulley 40 is fixed on the satellite sidewall and a first set of hinges 42 is provided for pivotally mounting a first rigid solar panel 44 to the yoke 22 for mutual rotation about a first panel hingeline 46. A first rigid panel pulley 48 is fixed to the first rigid solar panel and centered on the first panel hingeline 46.

A first synchronization cable 50 is fixed, respectively, to the sidewall synchronization pulley 40 and to the first rigid panel pulley 48. A yoke pulley 52 is fixed to the yoke 22, centered on the first panel hingeline 46 distant from the first rigid panel pulley 48. A second set of hinges 54 are provided for pivotally mounting a second rigid solar panel 56 to the first rigid solar panel 44 for mutual rotation about a second panel hingeline 58. In turn, a second rigid panel pulley 60 is fixed to the second rigid solar panel 56 and is centered on the second panel hingeline 58. A second synchronization cable 62 is fixed, respectively, to the yoke pulley 52 and to the second rigid panel pulley 60. In this manner, the deployment springs in each axis are linked together and are effective to move the yoke 22, the first rigid solar panel 44 and the second rigid solar panel 56 to the deployed position whereat the yoke, the first rigid solar panel, and the second rigid solar panel are mutually coplanar and extend transversely of the satellite sidewall.

With regard to the conventional construction of FIG. 2 utilizing flexible or blanket solar panels 28, when in the stowed condition, each panel is rolled up on an axis generally parallel to its associated rigid beam 32. A pair of drums 70 of flexible spring-like material 72 (see FIG. 2A) may be provided for each blanket solar panel 28. A free end of the flexible spring-like material 72 is attached to an extending end of flexible blanket solar panel 28 such that, when released from the stowed condition and motor driven outwardly, it extends the blanket solar panels into a planar condition. Simultaneously, the spring-like material 72 is caused to curl into a tubular form as illustrated at 74. The tubular form 74 of the spring-like material 72 becomes, then, when fully extended, the rigid booms 30 illustrated in FIG. 2.

Turn now to FIGS. 3 and 4 which illustrate one embodiment of the invention, a hybrid solar panel array 80 mounted on the satellite sidewall 34 for movement between a stowed position (FIG. 4) proximate the satellite sidewall and a deployed position (FIG. 3) extending away from the satellite sidewall. The components described with respect to FIG. 1 are an integral part of this embodiment. Thus, the solar panel array 80 includes the yoke 22 pivotally mounted on the satellite sidewall 34, the first rigid solar panel 44 pivotally mounted to the yoke along the hingeline 46, and the second rigid solar panel 56 pivotally mounted to the first rigid solar panel along the hingeline 58. Although not illustrated in FIGS. 3 and 4, the drive mechanism for deploying the array 80 is similar to that previously described with respect to FIG. 1A (i.e. torsional springs integral with hinges).

A pair of semi-rigid solar panels 82, 84 are pivotally mounted to the rigid solar panel 44 along lateral hingelines 86, 88, respectively and a pair of semi-rigid solar panels 90, 92 are pivotally mounted to the rigid solar panel 56 along lateral hingelines 94, 96, respectively. It will be appreciated that the lateral hingelines 94, 96 are aligned with the lateral hingelines 86, 88, respectively, when the hybrid solar panel array 80 is in the deployed position.

As generally considered for purposes of the invention, each of the rigid panels has a honeycomb core and a thickness in the range, approximately, of 1 to 1½ inches and each of the semi-rigid panels has a honeycomb core and a thickness in the range, approximately, of ⅛ to ⅜ inches.

Also, as particularly well seen in FIG. 3, the hybrid solar panel array 80 includes a fifth semi-rigid solar panel 98 pivotally mounted to the second rigid solar panel 56 along a third panel hingeline 100 spaced from but parallel to the first and second panel hingelines 46 and 58. For all of the pivotal connections between the rigid panels and the semi-rigid panels, hinges 102 are provided which may be of any suitable construction.

As seen in FIG. 4, when the solar panel array 80 is in the stowed position, the first and second rigid solar panels 44, 56 envelop between them all of the semi-rigid solar panels in overlapping, side by side relationship. This arrangement provides some protection for the semi-rigid panels during launch and prior to deployment.

Figure 6:
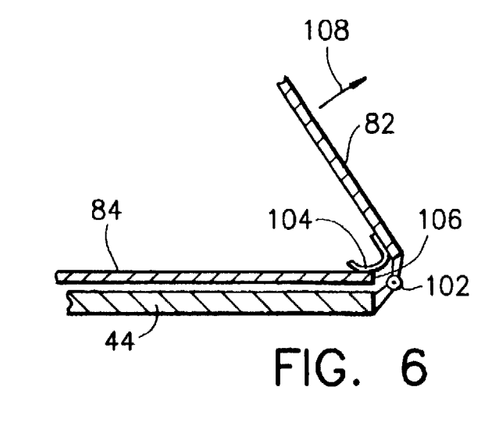
FIGS. 6 and 7 are a side elevation views, respectively, illustrating successive positions of the hybrid solar array of the invention as it is being deployed.

For full deployment of the array 80, a drive mechanism (again springs) additional to that already described for the rigid panels is provided for the semi-rigid panels. To this end, a bowed first spring member 104 (FIG. 6) is fixed on each of the semi-rigid solar panels for preventing other semi-rigid panels from unsequenced deployment. These springs (104) keep an adjacent panel in stowed position until the panel with spring 104 is moved out of the deployment path of the adjacent panel. Then the underlying (adjacent) panel is free to deploy. The deployment torque is provided by its own hinge springs. The spring member 104 extends along an edge of each semi-rigid panel which is adjacent the hingeline 88 for that particular panel.

Figure 5:
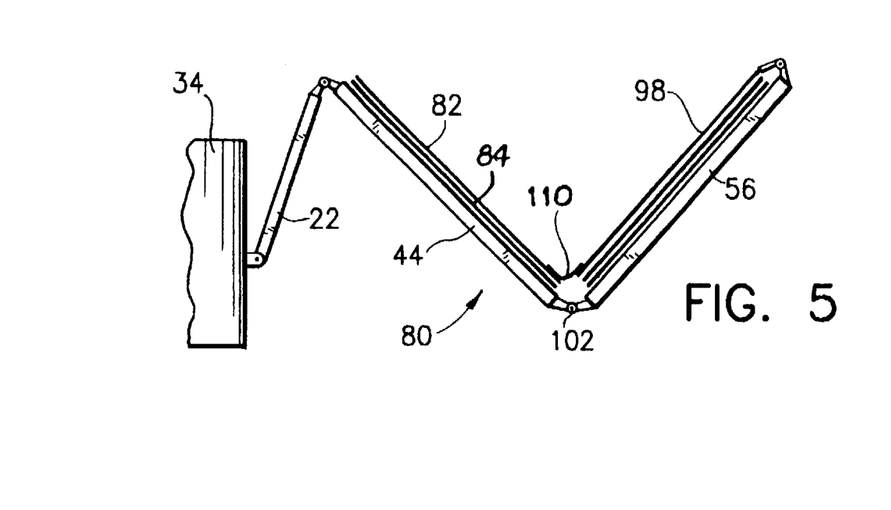
FIG. 5 is a detail section view, taken generally along line 5—5 in FIG. 7, of parts illustrated in FIGS. 3 and 4 to depict a critical construction of the invention.

Considering a specific part of the array 80 and, viewing FIG. 5, it is seen that in the stowed condition (FIG. 4), the panel 82 proximately overlies panel 84 and spring member 104 firmly engages the panel 84 adjacent a free edge 106 thereof. Subsequently, upon release of the array and allowance of deployment by operation of the deployment restraint mechanism for the rigid solar panels to extend the first and second rigid solar panels 44, 56 from the stowed position to the deployed position in the synchronous operation (see FIG. 3), the spring members 104 on the semi-rigid solar panels eventually move out of the way of the other semi-rigid panel deployment path allowing deployment of the semi-rigid panels in a sequential manner. Again deployment torque for each panel is provided by hinge springs (not the retaining spring, member 104).

Figure 7:
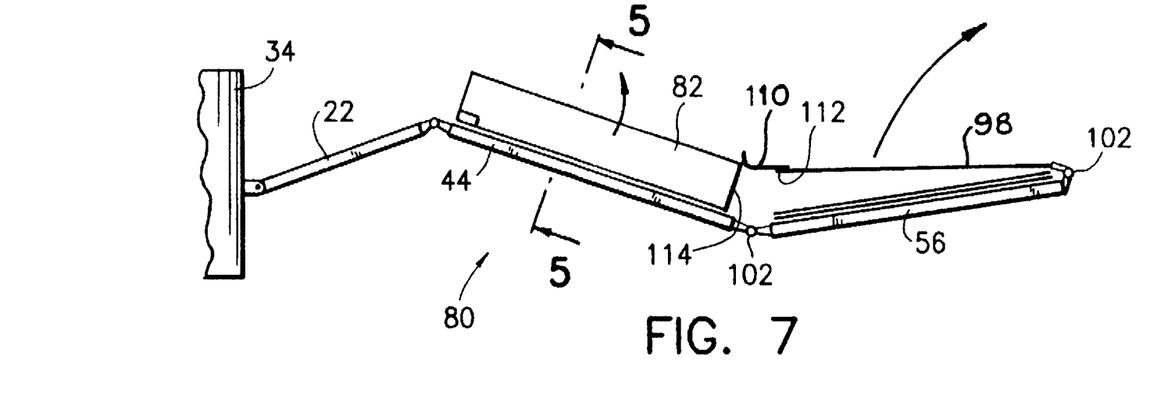

However, it must be recognized that before the first spring members 104 are drawn into operation, a second spring member 110 comes into play. This second spring member 110 is fixed to the panel 98 and projects from a free edge 112 of the panel 98 distant from its hingeline 100. When the array 80 is in the stowed position illustrated in FIG. 4, the spring member 110 engages and bears against the panel 82 adjacent an edge 114 thereof, holding the panel 82 closed and overlying the panel 84. However, when the array 80 moves toward the extended or deployed position illustrated in FIG. 3, passing through the sequential positions illustrated in FIGS. 6 and 7, a terminus of the second spring member 110 is drawn ever closer to the edge 114 when, as seen in FIG. 7, it finally slides out of engagement. A moment after the condition illustrated in FIG. 7, the spring member 110 becomes disengaged from the edge 114 of the panel 82, enabling the panel 82 and then the panel 84 to swing to their deployed positions under the bias of their associated springs located in their respective hinges. In a similar fashion, and immediately thereafter, the opening of the panel 98 then frees the panels 90 and 92 to swing to their deployed positions under the bias of their associated springs again integrally located within their hinges.

Figure 8:
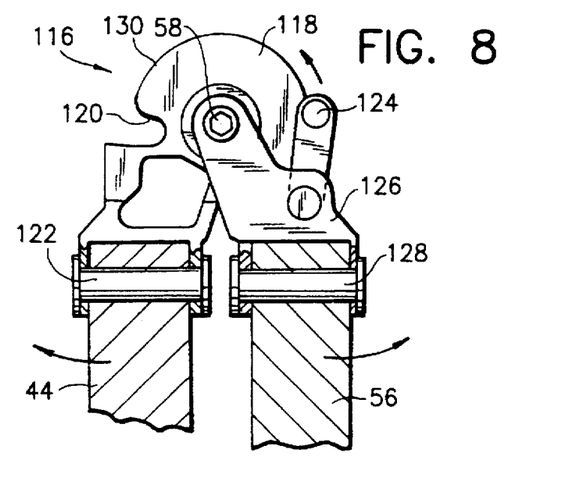
FIG. 8 is a side elevation view, partly in section, to illustrate a locking mechanism for adjacent panels of the hybrid solar array of the invention, the panels being in the stowed position and the locking mechanism being in the unlocked condition.
Figures 9, 10:
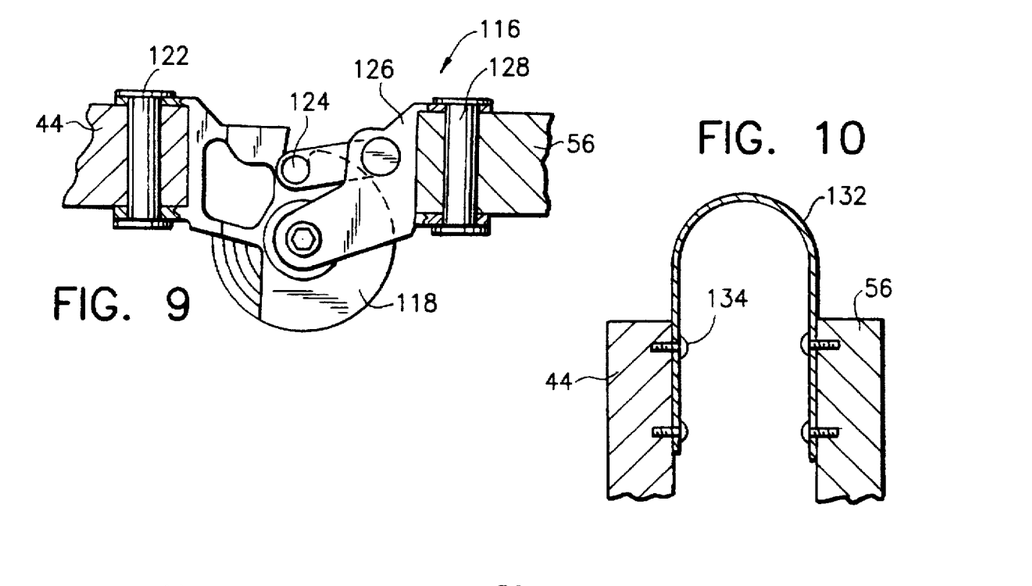
FIG. 9 is a side elevation view, partly in section, similar to FIG. 8, the adjacent panels being in the deployed position and the locking mechanism being in the locked condition.
FIG. 10 is a detail side elevation view, in section, illustrating an alternate hinge construction for joining adjacent panels depicting adjoining panels in the stowed condition.

Viewing now FIGS. 8 and 9, a suitable locking mechanism 116 is provided for securely retaining the rigid solar panels and the semi-rigid solar panels in the deployed position once achieved. In FIGS. 8 and 9, the locking mechanism 116 is depicted as between the rigid solar panels 44, 56 but it may just as well be utilized between the rigid and the semi-rigid panels, respectively. The locking mechanism 116 includes a cam member 118 which has a detent 120 in its outer surface and is fixed on the panel 44 as by a bolt 122. A cam follower 124 is pivotally mounted on an attachment bracket 126 which, in turn, is fixed on the panel 56 as by a bolt 128 adjacent the hingeline 58 intermediate the panels 44 and 56.

The cam follower 124 is biased into engagement with an outer surface 130 of the cam member as the solar panel array 80 moves toward the deployed position, and eventually drops into engagement with the detent 120 as said solar panel array moves to the deployed position. When the cam follower 124 drops into the detent 120, the solar panel array 80 is then permanently locked in the deployed position.

Figures 11, 12:
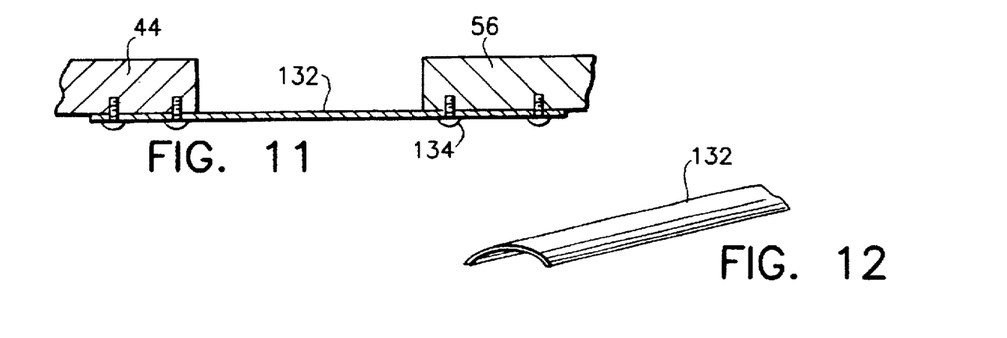
FIG. 11 is a detail side elevation view, in section, illustrating an alternate hinge construction for joining adjacent panels depicting adjoining panels in the deployed condition.
FIG. 12 is a detail perspective view of a component used in the alternate hinge construction illustrated in FIGS. 10 and 11.

FIGS. 10–12 illustrate another and simplified hinge construction which may be employed by the array 80. In this instance, flexible straps 132 may be joined to the panels 44, 56 by fasteners 134. The straps are of an appropriate material and appropriately dimensioned to enable the panels 44, 56 to move from the stowed condition illustrated in FIG. 10 to the deployed condition illustrated in FIG. 11. It may be of aid in this regard for the flexible straps 132 to be longitudinally bowed in the manner illustrated in FIG. 12. In FIGS. 8 and 9, the locking mechanism 116 is depicted as between the yoke 22 and the rigid solar panels 44, 56 but it may just as well be utilized between the rigid and the semi-rigid panels, respectively.

Figure 13:
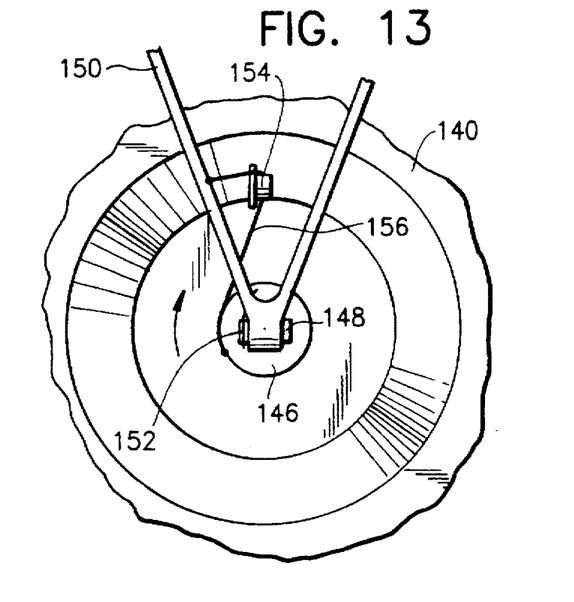
FIG. 13 is a detail front elevation view of another embodiment of the invention illustrating components thereof in the stowed condition.
Figure 14:
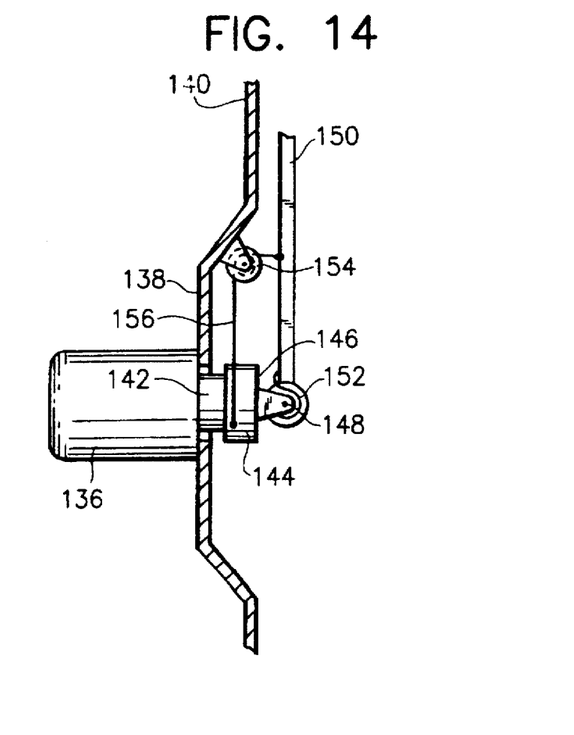
FIG. 14 is a detail side elevation view of the embodiment illustrated in FIG. 13.
Figure 15:
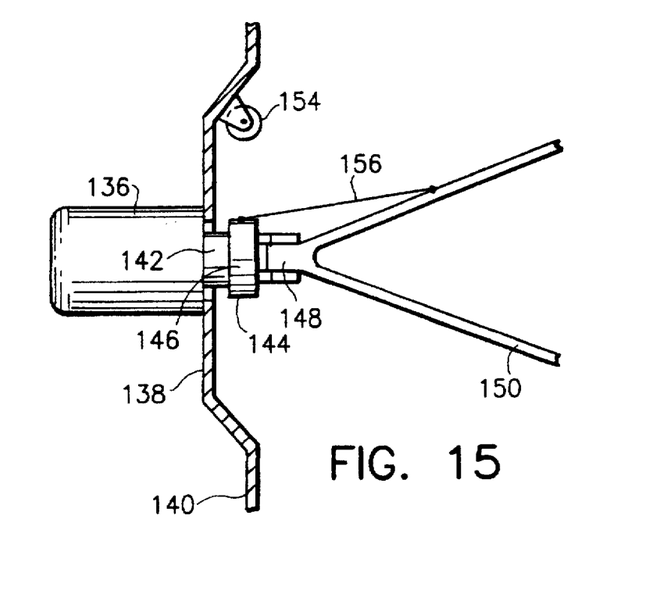
FIG. 15 is a detail side elevation view, similar to FIG. 14, illustrating components thereof in the deployed condition.

Turn now to FIGS. 13, 14, and 15 for the description of another embodiment of the invention, specifically, a modified mechanism for restraining deployment of the rigid solar panels 44, 56 and the yoke 22. This modified deployment restraint mechanism includes a stepper release motor 136 fixed on an interior surface of a modified satellite sidewall 140. A release shaft 142 projects away from the satellite sidewall and is mounted for rotation by the release motor. A boss member 144 integral with the release shaft 142 has a cylindrical peripheral surface and a transverse end surface 146 distant from the release motor 136. A yoke hinge 148 is mounted on the end surface 146 of the boss member for pivotally mounting a yoke 150 on the satellite sidewall 140.

A resilient member in the form of a torsion spring 152 suitably biases the yoke 150 to the deployed position (FIG. 15) from the stowed position (FIGS. 13 and 14). An open-ended pulley 154 is rotatably mounted on the satellite sidewall 140 at a location spaced radially from the boss member 144. A deployment restraint cable 156 is fixed at one end to the peripheral surface of the boss member 144 and is fixed at an opposite end to the yoke 150 distant from the yoke hinge 148. Initially, the restraint cable extends partially around the open-ended pulley 154 to restrain the yoke to the stowed position (FIGS. 13 and 14). However, upon the stepped rotation of the release shaft 142 by the release motor 136, the restraint cable is caused to gradually release the yoke to deploy and eventually to slide laterally across, then off of, the open-ended pulley 154, enabling the spring 152 to move the yoke 150 to the deployed position.

Figure 16:
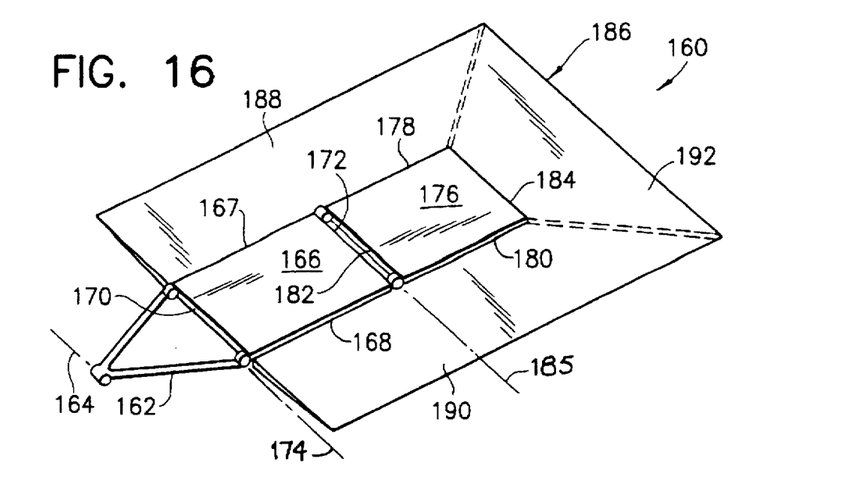
FIG. 16 is a perspective view of a fully deployed modified hybrid solar panel array embodying the present invention.
Figure 16A:
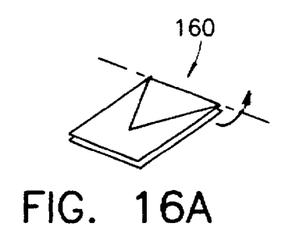
FIGS. 16A through 16F illustrate the incremental configurations achieved by the modified hybrid solar panel array of FIG. 16 as it is transformed from the stowed condition to the deployed condition.
Figures 16B, 16C:
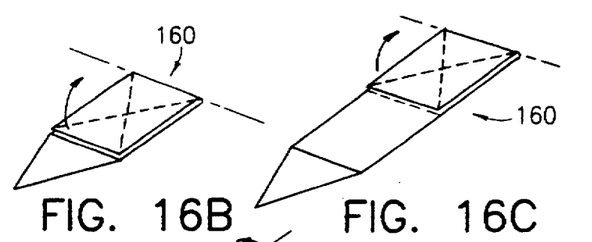
Figures 16D, 16E:
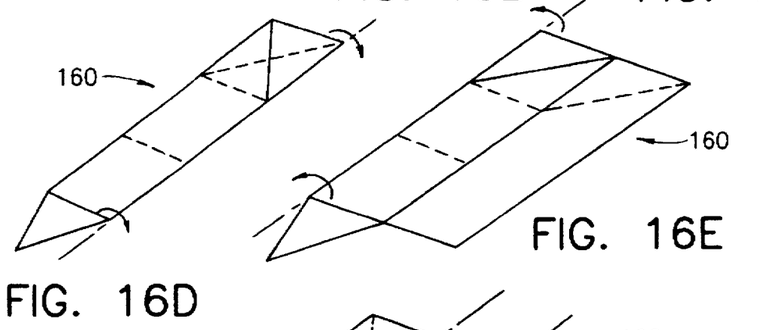
Figure 16F:
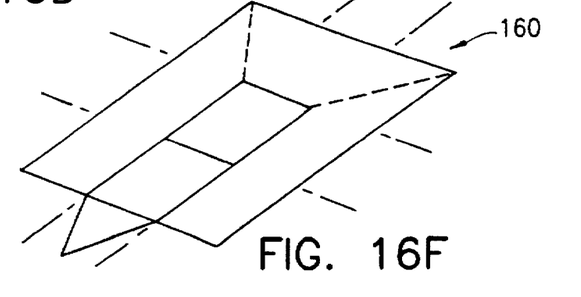

Turn now to FIGS. 16 through 16F for a description of a modified hybrid solar panel array 160. As previously explained with respect to the array 80, the array 160 is mounted on a satellite sidewall for movement between a stowed position proximate the satellite sidewall and a deployed position extending away from the satellite sidewall. The solar panel array 160 is illustrated in the deployed position in FIG. 16.

In this embodiment, a yoke 162, similar to the yoke 22, is pivotally mounted on the satellite sidewall (not shown in this figure) for rotation about a yoke hingeline 164. A first rectangular rigid solar panel 166 (similar to panel 44) has first and second opposed lateral edges 167, 168 and first and second opposed transverse edges 170, 172 and is pivotally mounted to the yoke for rotation about a first panel hingeline 174.

A second rectangular rigid solar panel 176 has first and second opposed lateral edges 178, 180 and first and second opposed transverse edges 182, 184. The second rigid solar panel 176 is pivotally mounted to the first rigid solar panel 166 for rotation about a second panel hingeline 185 at a mutually adjacent pair of the second and first transverse edges, 182, 172, respectively, of the first and second rigid solar panels.

A flexible solar panel 186 is attached to the first and second rigid solar panels, 166, 176, respectively. The flexible solar panel 186 includes a first section 188 attached to the first lateral edges 167, 178, a second section 190 attached to the second lateral edges 168, 180, and a third section 192 attached to the second transverse edge 184 of the second rigid solar panel 176.

The flexible solar panel 186 has the construction as previously described with respect to FIG. 2. Suitable drive mechanisms of the type previously described are provided for moving the hybrid solar panel array 160 between the stowed position and the deployed position. This includes a first drive mechanism for extending the first and second rigid solar panels 166, 176 from the stowed position to the deployed position in a synchronous operation and a plurality of second drive mechanisms for extending the first, second and third sections of the flexible solar panel from their stowed positions to their deployed positions, in a sequential operation, all as illustrated in sequence in FIGS. 16A through 16F.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A hybrid solar panel array mounted on a satellite sidewall for movement between a stowed position proximate the satellite sidewall and a deployed position extending away from the satellite sidewall, said solar panel array comprising:

a yoke pivotally mounted on the satellite sidewall;

a first rigid solar panel pivotally mounted to said yoke;

a second rigid solar panel pivotally mounted to said first rigid solar panel along an axis distant from said yoke;

a plurality of semi-rigid solar panels pivotally mounted to said first and second rigid solar panels, respectively; and drive means for moving said solar panel array between the stowed position and the deployed position.

2. A hybrid solar panel array as set forth in claim 1 wherein said drive means includes:

a first drive mechanism for extending said first and second rigid solar panels from the stowed position to the deployed position in a synchronous operation; and a plurality of second drive mechanisms for extending said plurality of said semi-rigid solar panels from their respective stowed positions to their respective deployed positions, in a sequential operation.

3. A hybrid solar panel array as set forth in claim 2 wherein said yoke is pivotally mounted for rotation about a yoke hingeline;

wherein said first rigid solar panel and said yoke are mutually pivotally mounted along a first panel hingeline; and wherein said second rigid solar panel and said first rigid panel are mutually pivotally mounted along a second panel hingeline spaced from but parallel to the first panel hingeline.

4. A hybrid solar panel array as set forth in claim 3 wherein said plurality of semi-rigid panels includes:
   first and second semi-rigid solar panels pivotally mounted to said first rigid solar panel along first and second spaced parallel lateral hingelines, respectively; and
   third and fourth semi-rigid solar panels pivotally mounted to said second rigid solar panel along third and fourth spaced parallel lateral hingelines, respectively, which are aligned with the first and second lateral hingelines, respectively, when said hybrid solar panel array is in the deployed position.

5. A hybrid solar panel array as set forth in claim 4 wherein said plurality of semi-rigid panels includes;
   a fifth semi-rigid solar panel pivotally mounted to said second rigid solar panel along a third panel hingeline spaced from but parallel to the first and second panel hingelines.

6. A hybrid solar panel array as set forth in claim 5 wherein said yoke is pivotally mounted on the satellite sidewall for rotation about a yoke hingeline;
   wherein said first drive mechanism includes:
   a deployment restraint device fixed on the satellite sidewall;
   a deployment drive shaft fixed to said yoke and mounted on the satellite sidewall for rotation upon operation of said deployment restraint device;
   a deployment pulley fixed on said satellite sidewall;
   first hinge means for pivotally mounting said first rigid solar panel to said yoke for mutual rotation about the first panel hingeline;
   a first rigid panel pulley fixed to said first rigid solar panel and centered on the first panel hingeline;
   a first synchronization cable fixed, respectively, to said deployment pulley and to said first rigid panel pulley;
   a yoke pulley fixed to said yoke, centered on the first panel hingeline distant from said first rigid panel pulley;
   second hinge means for pivotally mounting said second rigid solar panel to said first rigid solar panel for mutual rotation about the second panel hingeline;
   a second rigid panel pulley fixed to said second rigid solar panel and centered on the second panel hingeline;
   a second synchronization cable fixed, respectively, to said yoke pulley and to said second panel pulley;
   whereby operation of said deployment restraint device is effective to allow said yoke, said first rigid panel and said second rigid panel to the deployed position whereat said yoke, said first rigid solar panel, and said second rigid solar panel are mutually coplanar and extend transversely of the satellite sidewall.

7. A hybrid solar panel array as set forth in claim 4 wherein each of said rigid panels has a honeycomb core and has a thickness in the range, approximately, of 1 to 1½ inches; and
   wherein each of said semi-rigid panels has a honeycomb core and has a thickness in the range, approximately, of ⅛ to ¾ inches.

8. A hybrid solar panel array as set forth in claim 6 wherein, in the stowed position, said first and second rigid solar panels envelop between them said plurality of said second semi-rigid solar panels in overlapping, side by side relationship; and wherein said second restraining means includes a resilient member fixed on each of said semi-rigid solar panels for causing its associated said semi-rigid solar panel to deploy, in a predetermined sequence, toward the deployed position;
whereby, upon operation of said first drive mechanism to extend said first and second rigid solar panels from the stowed position to the deployed position in a synchronous operation, said resilient members on said semi-rigid solar panels are operable to allow deployment of said semi-rigid solar panels to the deployed position in a sequential operation.

9. A hybrid solar panel array as set forth in claim 2 including:
   locking means for securely retaining said rigid solar panels and said semi-rigid solar panels in the deployed position once achieved.

10. A hybrid solar panel array as set forth in claim 9 wherein said locking means includes:
    a cam member fixed on a first of said panels, said cam member having a detent therein; and
    a cam follower pivotally mounted on a second of said panels adjacent said first of said panels at one of said hingelines intermediate said first and second panels, said cam follower biased into engagement with said cam member as said solar panel array moves toward the deployed position, said cam follower biased into engagement with said detent in said cam member as said solar panel array moves to the deployed position and locking said solar panel array in the deployed position.

11. A hybrid solar panel array as set forth in claim 2 wherein said first drive mechanism includes:
    a stepper release motor fixed on the satellite sidewall;
    a release shaft projecting away from the satellite sidewall and mounted for rotation by said release motor;
    a boss member integral with said release shaft having a cylindrical peripheral surface and a transverse end surface distant from said motor;
    a yoke hinge mounted on said end surface of said boss member for pivotally mounting said yoke on the satellite sidewall;
    resilient means biasing said yoke to the deployed position;
    an open-ended pulley rotatably mounted on the satellite sidewall at a location spaced radially from said boss member;
    a deployment restraint cable fixed at one end to said peripheral surface of said boss member, fixed at an opposite end to said yoke distant from said yoke hinge, and initially extending partially around said open-ended pulley to restrain said yoke to the stowed position;
    whereby, upon stepped rotation of said release shaft by said release motor, said restraint cable is caused to slide laterally across, then off of, said open-ended pulley, enabling said resilient means to move said yoke to the deployed position.

12. A hybrid solar panel array mounted on a satellite sidewall for movement between a stowed position proximate the satellite sidewall and a deployed position extending away from the satellite sidewall, said solar panel array comprising:
    a yoke pivotally mounted on the satellite sidewall for rotation about a yoke hingeline;
    a first rectangular rigid solar panel having first and second opposed lateral edges and first and second opposed transverse edges and being pivotally mounted to said yoke for rotation about a first panel hingeline;

a second rectangular rigid solar panel having first and second opposed lateral edges and first and second opposed transverse edges, said second rigid solar panel being pivotally mounted to said first rigid solar panel for rotation about a second panel hingeline at a mutually adjacent pair of said second and first transverse edges of said first and second rigid solar panels, respectively;

a flexible solar panel attached to said first and second rigid solar panels, respectively; and drive means for moving said solar panel array between the stowed position and the deployed position.

13. A hybrid solar panel array as set forth in claim 12 wherein said flexible solar panel includes:

a first section attached to said first lateral edges of said first and second rigid solar panels;

a second section attached to said second lateral edges of said first and second rigid solar panels; and a third section attached to said second transverse edge of said second rigid solar panel.

14. A hybrid solar panel array as set forth in claim 13 including:

drive means for moving said hybrid solar panel array between said stowed position and said deployed position.

15. A hybrid solar panel array as set forth in claim 14 wherein said drive means includes:

a first drive mechanism for extending said first and second rigid solar panels from the stowed position to the deployed position in a synchronous operation; and a plurality of second drive mechanisms for extending said first, second and third sections of said flexible solar panel from their stowed positions to their deployed positions, in a sequential operation.

16. A hybrid solar panel array mounted on a satellite sidewall for movement between a stowed position proximate the satellite sidewall and a deployed position extending away from the satellite sidewall, said solar panel array comprising:

a yoke pivotally mounted on the satellite sidewall;

a first rigid solar panel pivotally mounted to said yoke;

a second rigid solar panel pivotally mounted to said first rigid solar panel along an axis distant from said yoke;

at least a third non-rigid solar panel joined to said first and second rigid solar panels, respectively; and drive means for moving said solar panel array between the stowed position and the deployed position.

* * * * *